July 1, 1930.  C. B. FAVERTY  1,769,683
ROAD GRADER WHEEL LEANING MECHANISM
Filed July 28, 1928   2 Sheets-Sheet 1
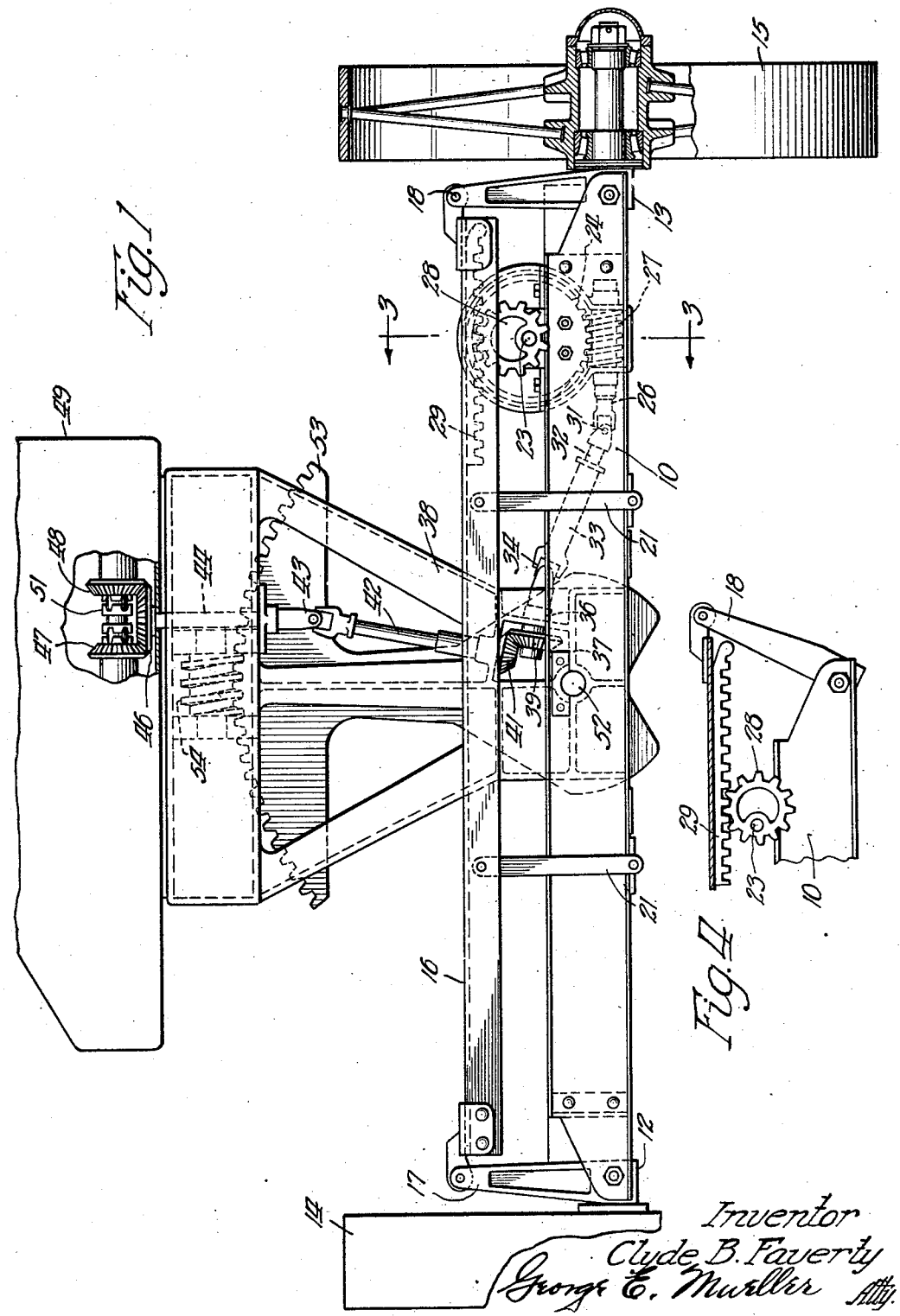
Inventor
Clyde B. Faverty July 1, 1930. C. B. FAVERTY 1,769,683
ROAD GRADER WHEEL LEANING MECHANISM
Filed July 28, 1928 2 Sheets-Sheet 2
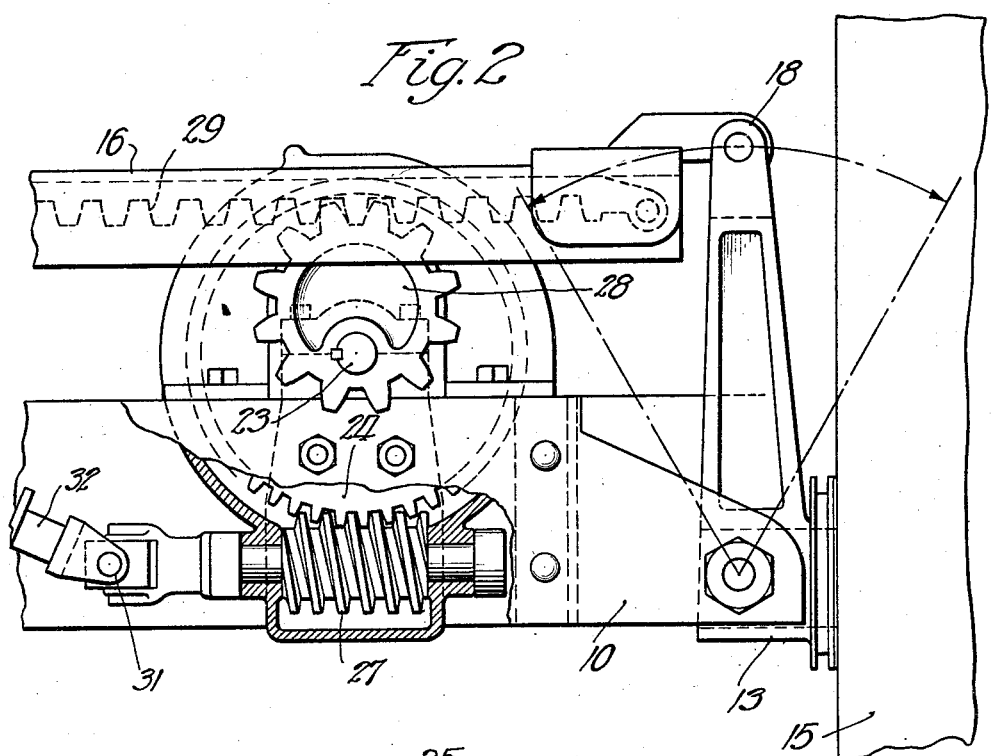
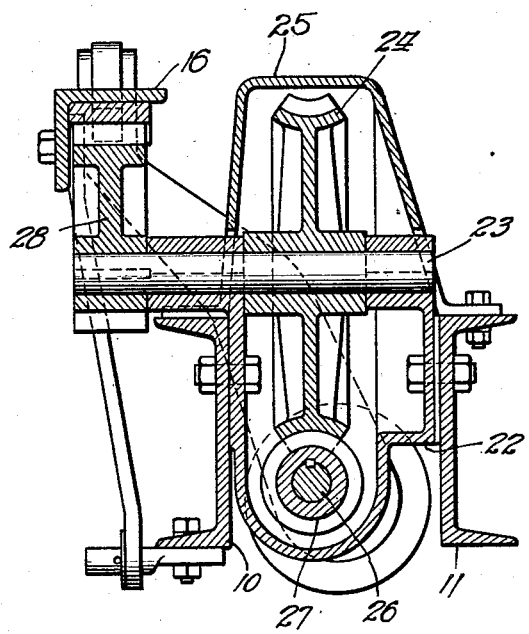
Inventor
Clyde B. Faverty
George E. Mueller
Atty.

Patented July 1, 1930

1,769,683

UNITED STATES PATENT OFFICE

CLYDE B. FAVERTY, OF HAMMOND, INDIANA, ASSIGNOR TO RYAN MNFG. CORPORATION, OF CHICAGO, ILLINOIS, A CORPORATION OF ILLINOIS

ROAD-GRADER WHEEL-LEANING MECHANISM

Application filed July 28, 1928. Serial No. 295,864.

My invention relates in general to road graders.

It relates more particularly to a wheel leaning mechanism particularly adaptable for use with road graders of the type described in the copending applications of Daniel C. Hinds, Serial No. 689,416, filed January 30, 1924, and Owen E. Grigsby, Serial No. 110,335, filed May 20, 1926, wherein a plurality of major adjustments is provided including means for leaning the frame with respect to the under carriage to compensate for irregularities in the ground and to secure certain adjustment features not otherwise obtained.

One of the principal objects of the present invention is to provide an improved wheel leaning mechanism.

Another object is to provide a wheel leaning mechanism wherein the power applied will be commensurate with the load to be moved.

Another object is to provide a road grader wherein more power is provided to lift the wheels than to lean them.

Another object is to provide a wheel leaning mechanism of simplified construction and improved operation.

One embodiment of my invention is shown in the accompanying drawings wherein:

Fig. 1 is a fragmentary rear end view of a grader showing my invention applied thereto;

Fig. 2 is an enlarged view of a portion of Fig. 1;

Fig. 3 is a sectional view taken along the line 3—3 of Fig. 1, and

Fig. 4 is a view similar to Fig. 2 but showing the parts in actuating position.

My invention contemplates applying the wheel leaning mechanism to both the front and rear wheels but the drawing shows the application of the principles involved to the rear wheels. The manner in which the power is carried to the front wheels is disclosed in my copending application Serial No. 215,088, filed August 24, 1927.

In the specific embodiment of the invention herein shown, the wheels are mounted on bell cranks, one arm of which serves as the axle with the other arm extending vertically upward and with a tie rod connecting opposite arms. A rack is provided on the tie rod with an eccentric gear meshing with the rack and adapted to drive the same. The gear is driven by means of power derived from a central power source on the grader, the power being communicated to the eccentric gear in a different way to the front and rear wheel mechanisms.

In the rear lean wheel assembly shown in the accompanying drawings, a rear axle is provided composed of channels 10 and 11 facing away from each other and held in spaced relation by any suitable cross members. At the end of the axles, bell cranks 12 and 13 are pivoted on the horizontal arms of which are supported wheels 14 and 15. The vertical bell crank arms are connected by a tie rod 16, pivot connections 17 and 18 being provided so that end movement of the tie rod will result in moving the bell cranks about their pivots and leaning the wheels. The tie rod is held in spaced relation from the axle by spacers 21—21, which have a pivot connection at each end and thus serve to reinforce the tie rod throughout its length, while permitting relative movement thereof with respect to the axle.

The axle has secured thereto, a housing 22 in which a transverse shaft 23 is journaled, the shaft having secured thereon a worm gear 24 confined within the housing and protected by a housing cover 25. The lower part of the housing forms a journal for a shaft 26 which carries a worm 27 meshing with the worm gear. This construction is the same for both the front and rear wheels with the exception that the means for transmitting motion to the shaft 26 varies in each instance.

As shown in Fig. 3, the shaft 23 has one end extending beyond the housing and to this end is secured an eccentric gear 28, which meshes with a rack 29 carried on the lower side of the tie rod. There are various advantages and functions connected with this specific arrangement of gearing which will be described more in detail hereinafter.

The worm shaft 26 is connected by a universal joint 31 to a telescoping drive shaft comprising an inner shaft 32 and an outer tube shaft 33 in which the shaft 32 is adapted to slide. Engagement between the two shafts is such as to permit this sliding motion while still resulting in a positive drive independent of the telescoping action.

The tube shaft 33 is connected by a universal joint 34 to a stub shaft 36 journaled in a housing 37 formed integral with the upright brace member 38 which constitutes a part of the frame. The shaft 36 has a bevel gear 39 mounted on its inner end which meshes with a bevel gear 41 carried by an upright shaft 42 which is also journaled in the housing 37. This housing therefore not only serves as a journal for the two shafts but also prevents the two bevel gears from being clogged by foreign matter such as earth, twigs and the like which might otherwise lodge between them.

The shaft 42 is connected by a universal joint 43 to a vertical shaft 44 carrying at its upper end a bevel gear 46, this gear meshing with a pair of bevel gears 47 and 48 which are rotatable on a suitable shaft, (not shown). These gears form a part of a gear box 49 which is described in the copending application of William J. Schlacks, Serial No. 295,913, filed July 28, 1928.

Fig. 1 shows a portion of the interior of the gear box indicating the manner in which movement is imparted to the shaft 44. The transverse shaft (not shown) on which the two bevel gears are journaled, is normally turned through a connection with a source of motive power carried on the grader frame. This shaft has a clutch member 51 free to slide thereon but turning therewith. It has its two end faces shaped to engage the crown ends of the bevel gears 47 and 48 so that by shifting the clutch member 51 into engagement with either one of the gears, the direction of rotation of the shaft 44 is reversed. When the clutch member is left in neutral position, the shaft of course will remain stationary. A suitable lever (not shown in the present application) is provided for shifting the clutch member 51.

As previously mentioned, the grader to which the invention is applied, preferably has a tiltable main frame. Fig. 1 illustrates the general arrangement at the rear of the grader for tilting the frame. This feature is described in detail in my application of Serial No. 295,865, filed July 28, 1928, but will be mentioned here briefly to indicate the manner in which the wheel leaning mechanism operates.

The upright member 38 forming a part of the frame, is connected to a pivot pin 52 suitably supported in the axle. This permits the frame to be tilted sideways with respect to the rear axle, the front of the frame being connected to the front axle by means of a universal joint preferably of the ball and socket type, so that the whole frame may be moved with respect to the two axles. The rear axle also carries an upright bracket terminating in a gear segment 53. This member is rigid and stationary with respect to the axle and has in meshing relation therewith, a relatively large spur gear 54 which is carried by the main frame and driven by suitable shafting leading to the gear box 49. By rotating this gear, either to the left or right, a corresponding tilting motion of the entire frame will result. When the shifting takes place, the housing 37 with the bevel gears, shafts 42 and 44 and gear box 49 are tilted with the frame. The angularity in the shaft resulting from this tilting is taken up by the universal joints 34 and 31, while the shortening or lengthening effect on the shaft connecting these two universal joints is obviously compensated for by the telescoping arrangement.

In operating the wheel leaning mechanism, the clutch member 51 is brought into contact with the proper gear so as to rotate the shaft 44 in the proper direction. In actual practice, a clutch lever is provided and the arrangement is such that if the wheels are to be leaned to the left, the clutch lever is pushed to the left, while if the movement is to the right the clutch lever is correspondingly moved.

Assume that the movement is to be to the right, the parts will then occupy the positions shown in Fig. 4. The manner in which this movement takes place is readily understood. The worm driving the worm gear 24, transmits the motion to the shaft 23 and thence to the eccentric gear 28. This causes a movement of the rack, which in turn operates the bell cranks about their respective pivots and so leans the wheels.

As the leaning movement takes place, the tie rod being secured on upright pivots, will naturally assume a position closest to the axle, the greater the end movement which it receives. It is observed that the eccentric gear readily accommodates itself to this movement and the teeth closest to the axis of the gear then engage the rack.

This feature of compensating for the vertical shifting of the rack is of great value but another result is obtained which is still more important from an operating and mechanical standpoint. It is obvious that a greater effort must be exerted to straighten the wheels after they are leaned than to lean them when they are in an upright position. When the teeth closest to the axis of the gear are in engagement with the rack, a shorter lever results and the force applied is greatly increased.

This force is calculated to vary directly with the distance between the fulcrum (which is the axis in this case) and the point of application of the force. The increasing effort applied to the rack while the wheels are in leaning position is therefore considerably greater than when the wheels are straight. In other words, the leverage increases and decreases as the wheels are changed and in accordance with the effort required to be put forth.

Another feature is that the force applied to the tie rod is always along the pitch line of the rack or in other words, directly along the axis of the tie rod. The gear has no direct lift to accomplish, the entire lifting effect being put forth by the bell cranks with the assistance of the spacers 21. It is obvious that a single lever on the shaft 23 for moving the tie rod, would have most of its work applied directly to the bottom of the tie rod in a direction so as to lift the same. The advantage of the construction herein shown wherein the entire force is applied directly along the pitch line of the rack, is therefore obvious.

The accompanying drawings have been described as showing a specific embodiment of my invention but it is obvious that the construction may be modified considerably without avoiding the invention which is limited only by the scope of the appended claims.

What I claim as new and desire to secure by United States Letters Patent is:—

1. In a road grader, a plurality of wheels, swivel mountings therefor, a tie rod connecting the swivel mountings for each pair of wheels, a rack on the tie rod, an eccentric gear meshing with the rack, and means for driving the gear in either direction to lean the wheels.

2. In a road grader, an axle, a bell crank with horizontal and vertical arms at the ends of the axle, wheels journaled on the horizontal arms, a tie rod having its ends pivotally secured to the vertical bell crank arms, a rack on the tie rod, an eccentric gear meshing with the rack and means for driving the gear to move the tie rod and lean the wheels.

3. In a road grader, an axle, a bell crank with horizontal and vertical arms pivoted at the ends of the axle, wheels journaled on the horizontal arms, a tie rod having its ends pivotally secured to the vertical bell crank arms, a rack on the tie rod, a shaft transverse of the axle, with an eccentric gear meshing with the rack and a driven gear also secured thereon, a drive gear meshing with the driven gear and shafting extending from the drive gear to a central source of power carried by the grader frame.

4. The combination defined in claim 3 with pivotally connected bars between the axle and tie rod for reinforcing the tie rod and spacing it parallel to the axle.

5. In a road grader, an axle, bell cranks secured at the ends of the axle with vertical and horizontal arms, wheels mounted on the horizontal arms, a tie rod connecting the vertical arms, a straight rack carried by the tie rod on the side thereof adjacent said axle and an eccentric gear meshing with the rack and adapted to move the rack and so lean the wheels.

In witness whereof, I hereunto subscribe my name this 1st day of May, 1928.

CLYDE B. FAVERTY.